US010095587B1

(12) United States Patent
Varrin et al.

(10) Patent No.: US 10,095,587 B1
(45) Date of Patent: Oct. 9, 2018

(54) RESTRICTED DATA ZONES FOR BACKUP SERVERS

(75) Inventors: Daniel Varrin, Mississauga (CA);
Michael Jacek Drozd, Cracow (PL);
Michael G. Roche, Hamilton (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 207 days.

(21) Appl. No.: 13/336,898

(22) Filed: Dec. 23, 2011

(51) Int. Cl.
*G06F 11/14* (2006.01)
*G06F 11/20* (2006.01)

(52) U.S. Cl.
CPC ...... *G06F 11/1456* (2013.01); *G06F 11/2071* (2013.01); *G06F 11/2074* (2013.01)

(58) Field of Classification Search
CPC ............ G06F 11/1456; G06F 11/2074; G06F 11/2071
USPC ........................................................ 711/162
See application file for complete search history.

(56) References Cited

U.S. PATENT DOCUMENTS

| | | | | |
|---|---|---|---|---|
| 6,970,991 | B2* | 11/2005 | Harman | 711/206 |
| 7,024,529 | B2* | 4/2006 | Yamada et al. | 711/162 |
| 7,330,997 | B1* | 2/2008 | Odom | 714/6.23 |
| 7,991,809 | B2* | 8/2011 | Yellapragada | 707/827 |
| 2006/0070124 | A1* | 3/2006 | Arndt et al. | 726/17 |
| 2006/0221377 | A1* | 10/2006 | Nishio | 358/1.14 |
| 2010/0205149 | A1* | 8/2010 | Sekiya | 707/640 |
| 2010/0223452 | A1* | 9/2010 | Chung | 713/2 |
| 2010/0332401 | A1* | 12/2010 | Prahlad et al. | 705/80 |

* cited by examiner

*Primary Examiner* — Michael Alsip
(74) *Attorney, Agent, or Firm* — Van Pelt, Yi & James LLP (57) ABSTRACT

A method for backing up and recovering data is disclosed. Data representing an allocation of a plurality of backup resources to a plurality of restricted data zones is stored in a storage device. Any of the plurality of backup resources allocated to one restricted data zone is not allocated to another restricted data zone. A user is associated with one of the plurality of restricted data zones. Backup and recovery services are provided to the user using one or more backup resources allocated to the restricted data zone associated with the user. The backup and recovery services provided to the user are segregated from backup and recovery services provided to other users associated with restricted data zones that are different from the restricted data zone associated with the user.

20 Claims, 11 Drawing Sheets

RESTRICTED DATA ZONES FOR BACKUP SERVERS

BACKGROUND OF THE INVENTION

The computer files and data stored on file servers or workstations can be lost after a data loss event. For example, the computer files and data stored on a file server or a workstation may be accidentally deleted by end-users, intentionally corrupted by the malicious acts of outsiders, or destroyed by a disaster, such as a fire or earthquake. It is therefore desirable for computer files and data stored on a file server or a workstation to be backed up periodically by a backup and recovery system, so that they may be restored after a data loss event. However, designing a backup and recovery system poses many challenges, including privacy issues and producing a backup and recovery solution that is cost-effective.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Defining restricted data zones in a backup and recovery server is disclosed. In various embodiments, a single backup and recovery server is shared by distinct users and/or groups of users, for example two or more distinct enterprises. Each user's or user group's data is restricted to being accessed by authorized administrators associated with that user or user group. Backup and recovery operations may be performed within a restricted zone only by administrators having privileges associated with that zone. In some embodiments, the resource management capacity of the backup and recovery server is parceled out to the respective restricted data zones, and within each restricted data zone, administrative users with privileges with respect to that zone are able to define up to a prescribed number of each of one or more types of resource.

Figure 1:
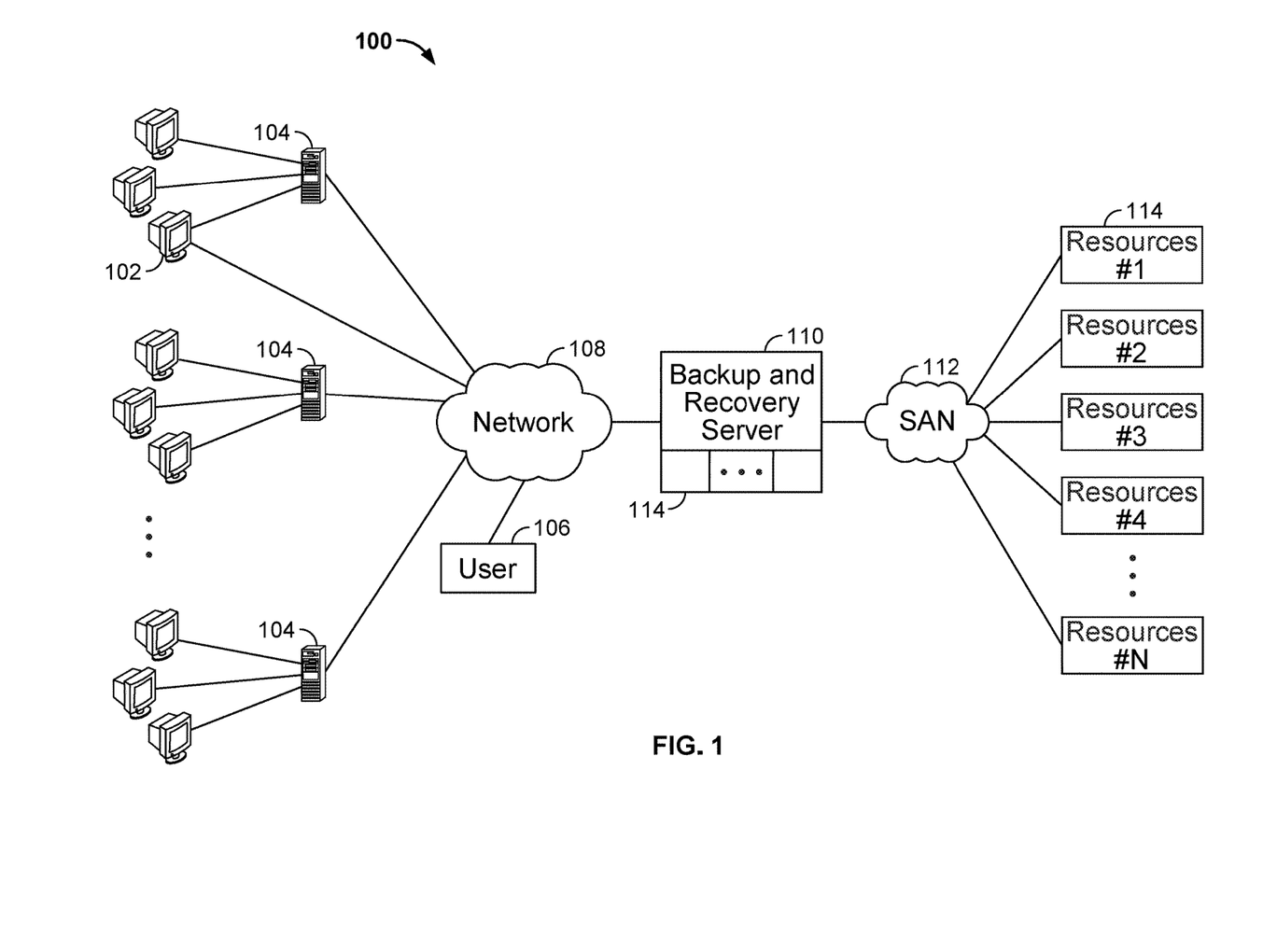
FIG. 1 is a block diagram illustrating an embodiment of a backup and recovery system 100.

FIG. 1 is a block diagram illustrating an embodiment of a backup and recovery system 100. As shown in FIG. 1, a group of workstations or computers 102 store their computer files and data (e.g., documents, sound files, photographs, movies, and images) on a file server 104. File server 104 and workstations 102 are connected to a backup and recovery server 110 via a network 108. One example of the backup and recovery server 110 is EMC Corporation's NetWorker server. In some embodiments, network 108 includes a dedicated communication link, one or more networks, a local area network, the Internet, a wired network, a wireless network, a storage area network, and the like. In some embodiments, backup and recovery server 110 is used to service multiple file servers and workstations.

The computer files and data stored on file server 104 or workstations 102 can be lost after a data loss event. For example, the computer files and data stored on file server 104 or workstations 102 may be accidentally deleted by end-users, intentionally corrupted by the malicious acts of outsiders, or destroyed by a disaster, such as a fire or earthquake. Therefore, the computer files and data stored on file server 104 or workstations 102 should be backed up periodically, such that they may be restored after a data loss event.

A user 106, e.g., an information technology (IT) administrator, may configure backup and recovery server 110 to provide backup and recovery services to file server 104 or workstations 102. For example, user 106 first initiates a communication session with backup and recovery server 110 via network 108. After backup and recovery server 110 authenticates user 106, user 106 may configure backup and recovery server 110 to periodically backup the contents of file server 104 or workstations 102 into backup storage. For example, backup storage may include hard disks, solid state storage, virtual tape libraries (VTL), magnetic tapes, and the like.

In some embodiments, backup and recovery server 110 manages or utilizes different backup resources 114. Backup resources 114 include clients, groups, devices, directives, jukeboxes, labels, media pools, schedules, policies, storage nodes, operation status, and the like, as will be described in greater detail below.

Backup resources 114 include clients and groups. A client is a computer, workstation, or file server whose data can be backed up or recovered. Client resources identify the save sets to be backed up on a client. The client resource also specifies information about the backup, such as the schedule, browse policy, and retention policy for the save sets. In some embodiments, backup and recovery server 110 limits the number of clients that can be backed up or recovered. A group is a client or group of clients configured to back up files to backup and recovery server 110 at a designated time of day.

Some backup resources 114 are one or more of the following: devices, media pools, jukeboxes, and storage nodes. A device is a storage unit that reads from and writes to backup volumes. A storage unit can be a tape device, optical drive, autochanger, or file connected to the server or storage node. Media pools include physical storage media, such as magnetic tapes, optical disks, or file systems to which backup data are written. A jukebox is a mechanism that uses a robotic arm to move media among various components in a device. The term jukebox is synonymous with library, autochanger, autoloader, carousel, datawheel, and near-line storage. A storage node is a storage device physically attached to another computer whose backup operations are controlled by backup and recovery server 110.

Other backup resources 114 are one or more of the following: directives, labels, and policies. Directives are instructions to take special actions on a given set of files for a specified client during backup. A label is something that uniquely identifies a volume, such as a NetWorker assigned label. Templates can be used to define label parameters. A policy is a set of constraints that specify how long data is available for recovery. Each client resource has a browse policy and a retention policy.

Some of the backup resources, e.g., storage nodes and devices, are accessible by backup and recovery server 110 via a storage area network 112 (SAN). In some embodiments, file server 104 is also on the same SAN. Backup and recovery server 110 coordinates backup operations using backup "clients" that reside on file server 104. The backup "clients," which are under the control of backup and recovery server 110, cause file server 104 to send data via the SAN directly to the backup storage devices on the SAN. Some of the backup resources are located at backup and recovery server 110. As shown in FIG. 1, backup and recovery server 110 and all of the backup resources 114 associated with the server are assigned to a single data zone. As a result, all of the backup resources 114 can be managed by any user, e.g., user 106, who has been authenticated by backup and recovery server 110. For example, user 106 may configure all of the backup resources 114, monitor the backup and recovery processes, and view all of the configuration information and backup data.

Figure 2:
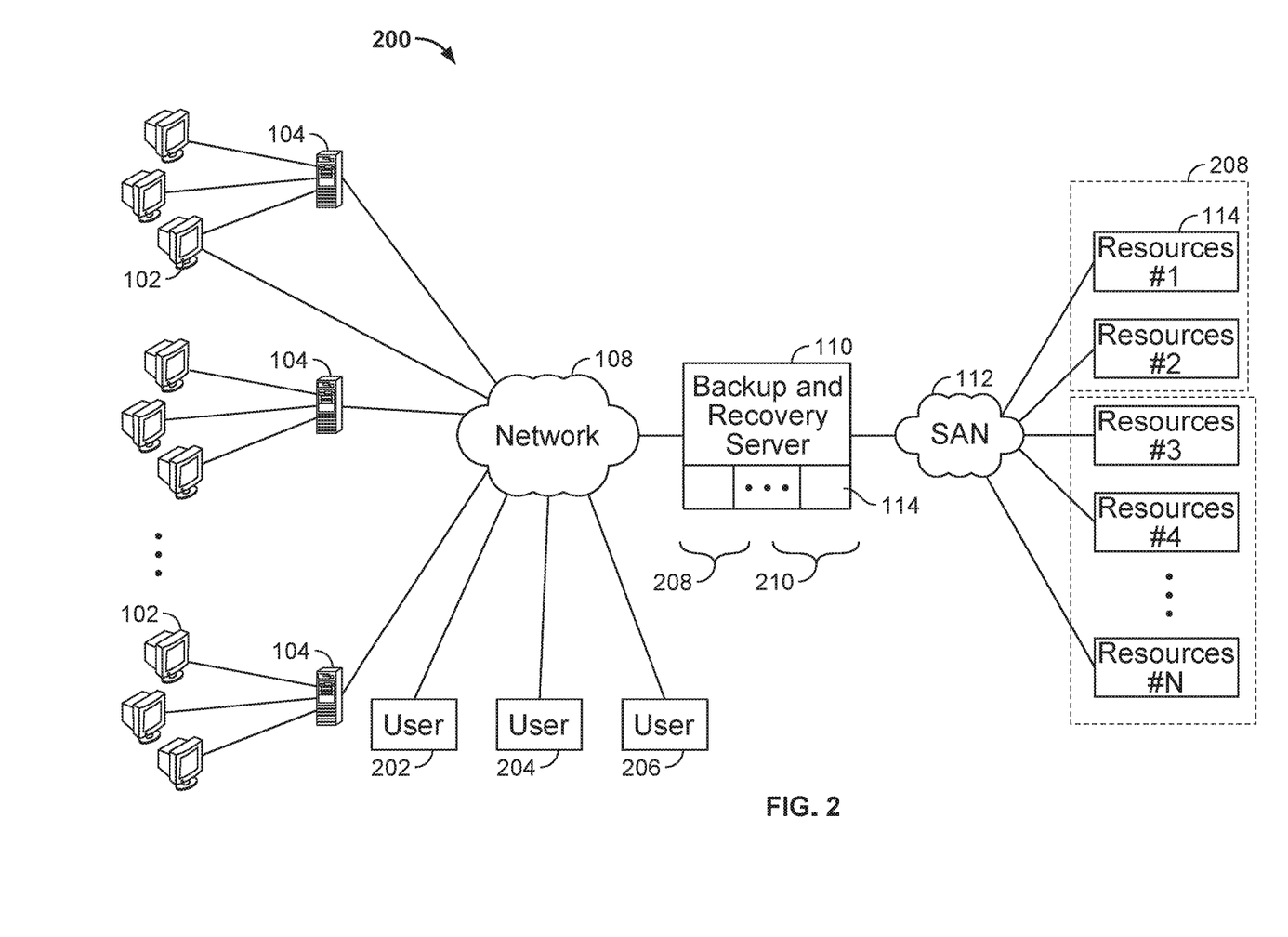
FIG. 2 is a block diagram illustrating an embodiment of a backup and recovery system 200.

FIG. 2 is a block diagram illustrating an embodiment of a backup and recovery system 200. Similar to the backup and recovery system 100 in FIG. 1, a single backup and recovery server 110 is used to service multiple file servers and workstations. Backup and recovery server 110 periodically backups the contents of multiple file servers 104 or workstations 102 into backup storage. However, unlike system 100 in FIG. 1, the various backup resources 114 associated with backup and recovery server 110 in system 200 are segregated into two restricted data zones, restricted data zone 208 and restricted data zone 210. Note that the backup resources can be segregated into more than two restricted data zones. The above example of segregating the backup resources into two zones is provided for illustrative purposes. Accordingly, the present application is not limited to this specific example only.

The restricted data zone feature allows a single backup and recovery server 110, e.g., a NetWorker server, to be segmented in such a way as to enable multiple groups of users, each group being associated with a particular restricted data zone, to share a single server without being affected by other groups of users. In some embodiments, the group of users in one restricted data zone cannot view any information associated with other restricted data zones; nor can the group of users modify or affect other restricted data zones. For example, any user in one restricted data zone is restricted from viewing the information of the resources allocated to other restricted data zones, such as the configuration information or status information of the resources allocated to other restricted data zones. The user is also restricted from viewing or modifying any backup or recovery processes or backup data that belong to other restricted data zones. In some embodiments, users in one restricted data zone are not even aware of the existence of other restricted data zones, thereby preserving the complete privacy of one restricted data zone from the others.

Backup and recovery system 200 can be configured to meet different business needs. In some embodiments, backup and recovery server 110 can be used to provide backup services for an entire company or organization. A top-level IT administrator oversees the general backup and recovery operation of the company or organization. In addition to a global data zone, the top-level IT administrator may configure a separate restricted data zone for each department within the company or organization. For example, separate restricted data zones may be configured for the human resource department, the sales department, the marketing department, and the like.

In some embodiments, for each restricted data zone, the top-level IT administrator grants different privileges to one or more lower-level users, e.g., one or more restricted data zone IT administrators, to create, manage, or monitor the backup resources within the specific restricted data zone in a restricted fashion. For example, user 202 in FIG. 2 is the top-level IT administrator who segregates backup resources 114 into two restricted data zones, restricted data zone 208 and restricted data zone 210. User 204 is the lower-level IT administrator for restricted data zone 208, and user 206 is the lower-level IT administrator for restricted data zone 210.

In some embodiments, each of a portion of the restricted data zones configured by the top-level IT administrator is managed by a lower-level user, and the remaining portions of the restricted data zones are managed by the top-level IT administrator himself. For example, user 202 in FIG. 2 is the top-level IT administrator who is also responsible for managing the restricted data zone 208. User 204 is the lower-level IT administrator for restricted data zone 210, and user 206 is a regular user within restricted data zone 210 who has fewer privileges granted by the top-level IT administrator as compared to user 204.

The advantages of the above described setup for a company or an organization include, in various embodiments, enabling the entire company or organization to share a single backup and recovery server that is being generally overseen or supervised by a top-level IT administrator, and providing the lower-level IT administrators with some flexibility in managing their own restricted data zones. As a result, a higher degree of autonomy and privacy can be offered to the individual departments.

In some embodiments, backup and recovery server 110 may be used by a data protection service provider who provides backup services to a number of customers called tenants. The data protection service provider owns and maintains backup and recovery server 110 and the backup resources associated with it, and the tenants who use the server and the resources are charged a fee by the service provider based on their respective amount of usage.

Typically, the tenants are independent companies or organizations. Accordingly, the complete privacy of the backup data belonging to each tenant and the internal management of those data should be preserved. For example, any tenant is restricted from viewing the information of the resources allocated to other tenants, such as the configuration information or status information of the resources allocated to other tenants. Each tenant is also restricted from viewing or modifying any backup or recovery processes or backup data that belong to other tenants. In some embodiments, each tenant is not even aware of the existence of other tenants, thereby preserving the complete privacy of one tenant from the others.

In some embodiments, a top-level IT administrator representing the data protection service provider may configure a separate restricted data zone for each of the tenants. For each tenant, the top-level IT administrator grants privileges to a tenant IT administrator to create, manage, or monitor the backup resources allocated to the tenant in a restricted fashion. For example, a high-demand tenant may be charged a higher fee for the privileges to create a higher maximum number of backup clients (i.e., maximum client count) or the privileges to use a higher maximum number of backup devices (i.e., maximum device count) than a regular tenant. Although the top-level IT administrator has control over and access to certain aspects of the restricted data zones, the top-level IT administrator may not have full access. In some embodiments, the top-level IT administrator is blocked from viewing or modifying the backup data of each tenant. In some embodiments, the top-level IT administrator may also be blocked from viewing or modifying the internal configurations of the restricted data zones.

The above described business model is advantageous because it enables multiple companies or organizations to share a single backup and recovery server, without compromising the privacy and autonomy of the individual companies or organizations.

Figure 3A:
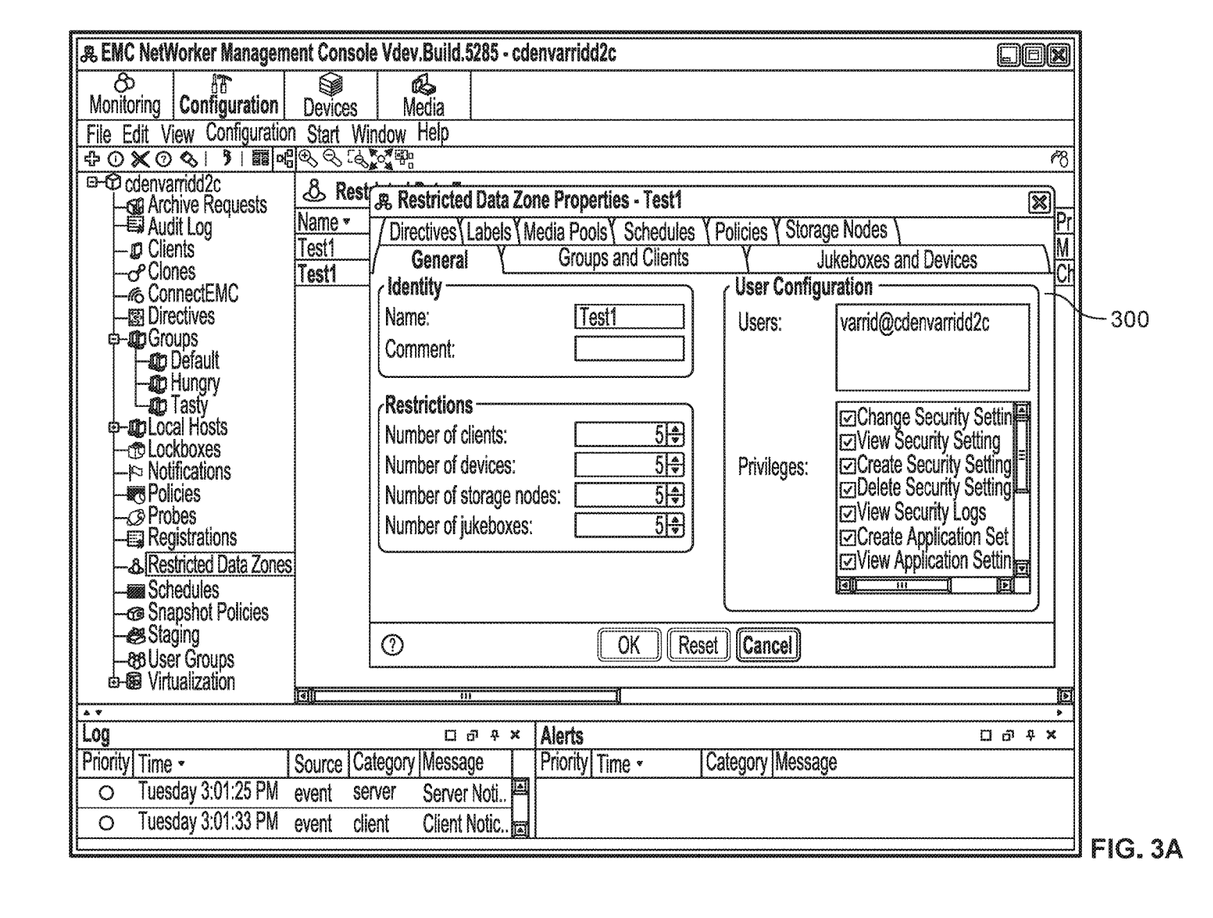
FIG. 3A is a diagram illustrating an embodiment of a GUI pop-up window 300 for a top-level IT administrator to configure the general features of a restricted data zone.

Users can configure backup and recovery server 110 using a command-line interface (CLI) or a graphical user interface (GUI). FIG. 3A is a diagram illustrating an embodiment of a GUI pop-up window 300 for a top-level IT administrator to configure the general features of a restricted data zone. As shown in FIG. 3A, pop-up window 300 allows the top-level IT administrator to enter a name for the restricted data zone, set up a number of restrictions for the restricted data zone, specify one or more users that are associated with the restricted data zone, and grant one or more privileges to the one or more users. The top-level IT administrator may limit the maximum number of clients, devices, storage nodes, and jukeboxes that can be created in the restricted data zone. In this specific example, only one user is associated with the restricted data zone, and the user is a lower-level IT administrator responsible for managing the restricted data zone. The lower-level IT administrator is granted different privileges by the top-level IT administrator, including the privileges to change, view, create, or delete security settings, the privileges to create or view application settings, and the like.

Figure 3B:
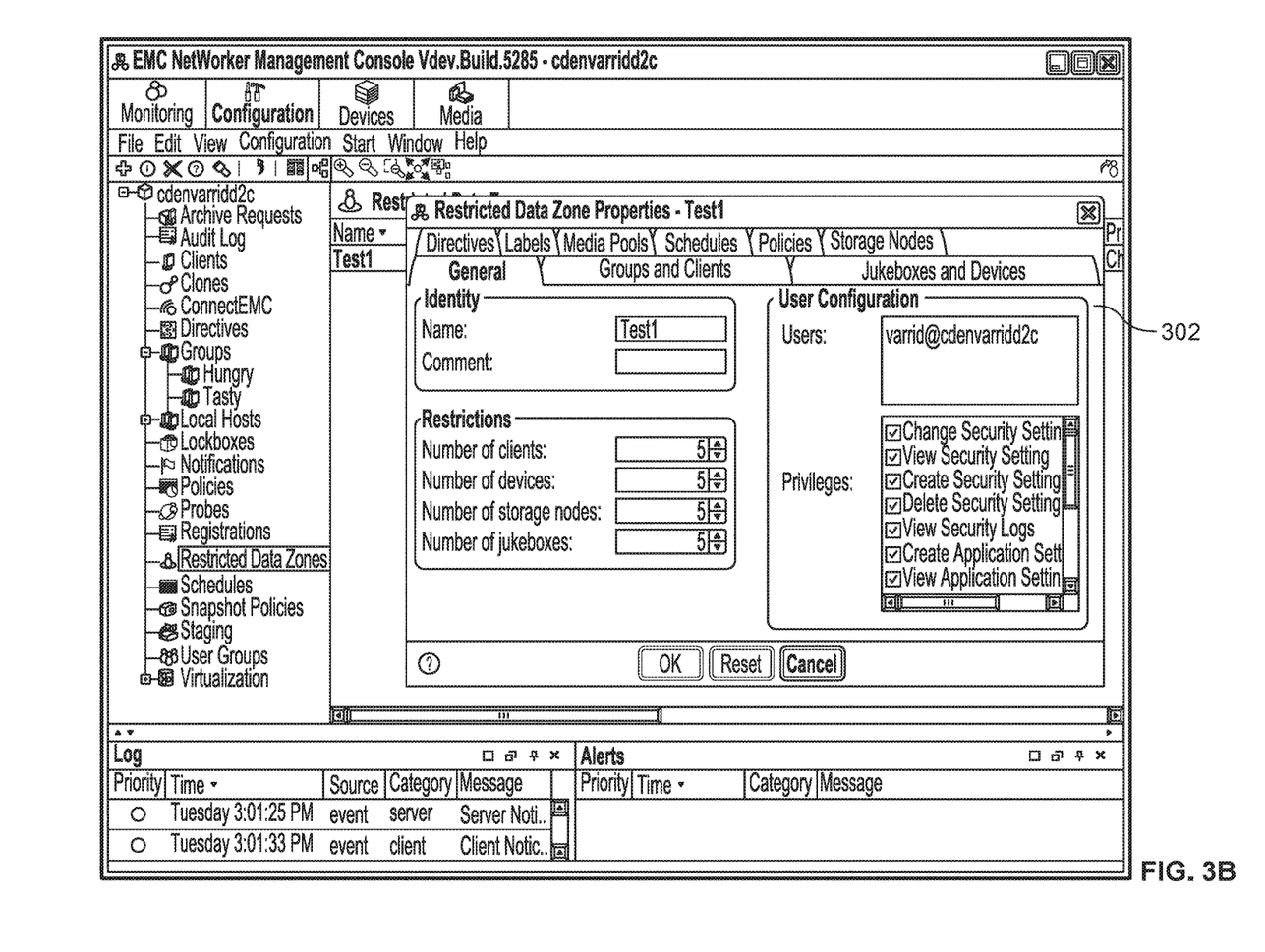
FIG. 3B is a diagram illustrating an embodiment of a GUI pop-up window 302 for the lower-level IT administrator to view the general features of the restricted data zone configured by the top-level IT administrator using GUI pop-up window 300 in FIG. 3A.

FIG. 3B is a diagram illustrating an embodiment of a GUI pop-up window 302 for the lower-level IT administrator to view the general features of the restricted data zone configured by the top-level IT administrator using GUI pop-up window 300 in FIG. 3A. The lower-level IT administrator can view the maximum client count, device count, storage node count, and jukebox count from GUI pop-up window 302. However, he/she is not allowed to modify these maximum counts. Accordingly, if the lower-level IT administrator attempts to create more resources in the restricted data zone than the corresponding resource maximum count, an error message will be provided to the lower-level IT administrator, and the resource will not be created.

Figure 4A:
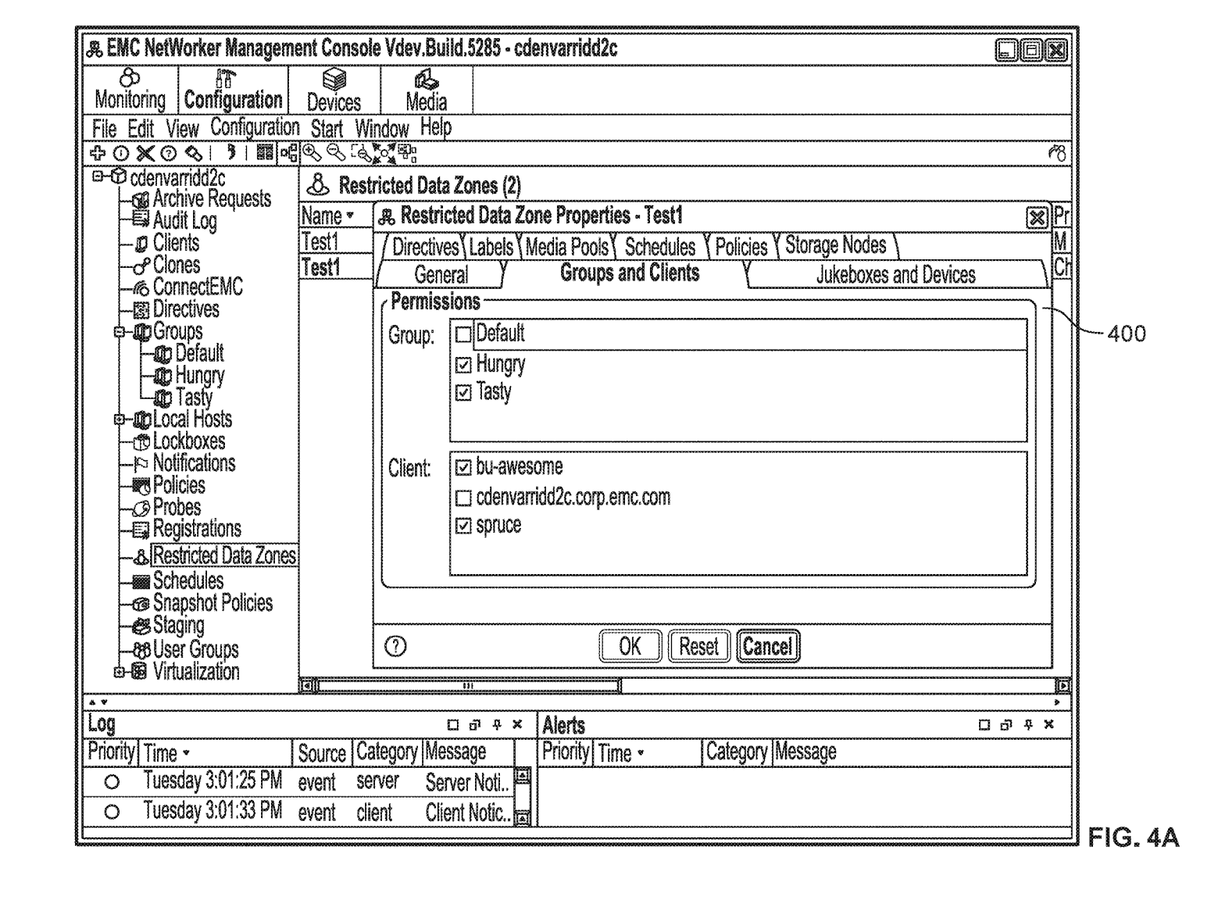
FIG. 4A is a diagram illustrating an embodiment of a GUI pop-up window 400 for a top-level IT administrator to configure or view the client and group resources of a restricted data zone.
Figure 4B:
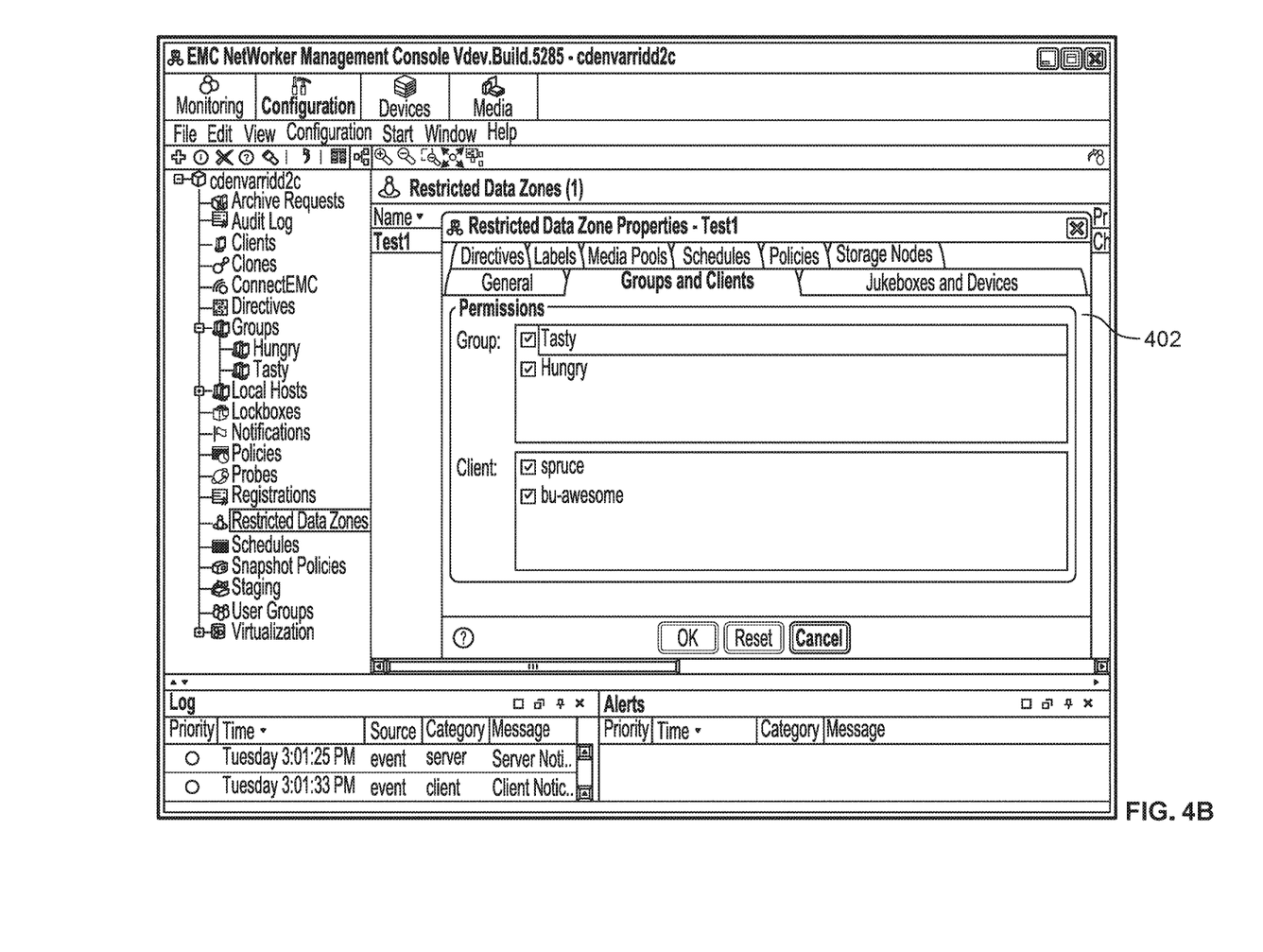
FIG. 4B is a diagram illustrating an embodiment of a GUI pop-up window 402 for the lower-level IT administrator to configure or view the client and group resources of a restricted data zone.

FIG. 4A is a diagram illustrating an embodiment of a GUI pop-up window 400 for a top-level IT administrator to configure or view the client and group resources of a restricted data zone. FIG. 4B is a diagram illustrating an embodiment of a GUI pop-up window 402 for the lower-level IT administrator to configure or view the client and group resources of a restricted data zone. As shown in FIG. 4A, the top-level IT administrator is shown a total of three clients: bu-awesome, cdenvarridd2c.corp.emc.com, and spruce. In contrast, as shown in FIG. 4B, the lower-level IT administrator is shown only two of the three clients: spruce and bu-awesome. Fewer clients are visible to the lower-level IT administrator because clients that are not within the restricted data zone managed by the lower-level IT administrator are filtered out. As a result, client resources corresponding to different restricted data zones are segregated.

In some embodiments, a restricted data zone attribute is used to identify the restricted data zone that a particular resource is associated with. The restricted data zone attribute of a resource can be used to filter out resource information that does not belong to a particular restricted data zone, and the filtered resource information can be displayed to a user associated with the restricted data zone using the GUI described above.

For example, in a NetWorker server, different types of information of backup resources 114 (such as the configuration information or status information of the resources) are stored in a remote administration protocol (RAP) database. Since each of the resources can be associated with a single restricted data zone only, the restricted data zone attribute of a resource identifies the restricted data zone in which the information of the resource can be displayed. When a query is sent to the RAP database to retrieve resource information to be displayed on the GUI for a user, the retrieved resource information is filtered by matching the restricted data zone attribute of the resource with the restricted data zone that is associated with the user. In some embodiments, the retrieved resource information is further filtered based on the privileges of the user which are granted by the top-level IT administrator.

Similarly, a restricted data zone attribute may be used to identify the restricted data zone that a particular save set is associated with. A save set is a group of files or a file system which is backed up on storage media. The restricted data zone attribute of a save set can be used to filter out save set information that does not belong to a particular restricted data zone, and the filtered information can be displayed to a user associated with the restricted data zone using the GUI described above.

Figure 5A:
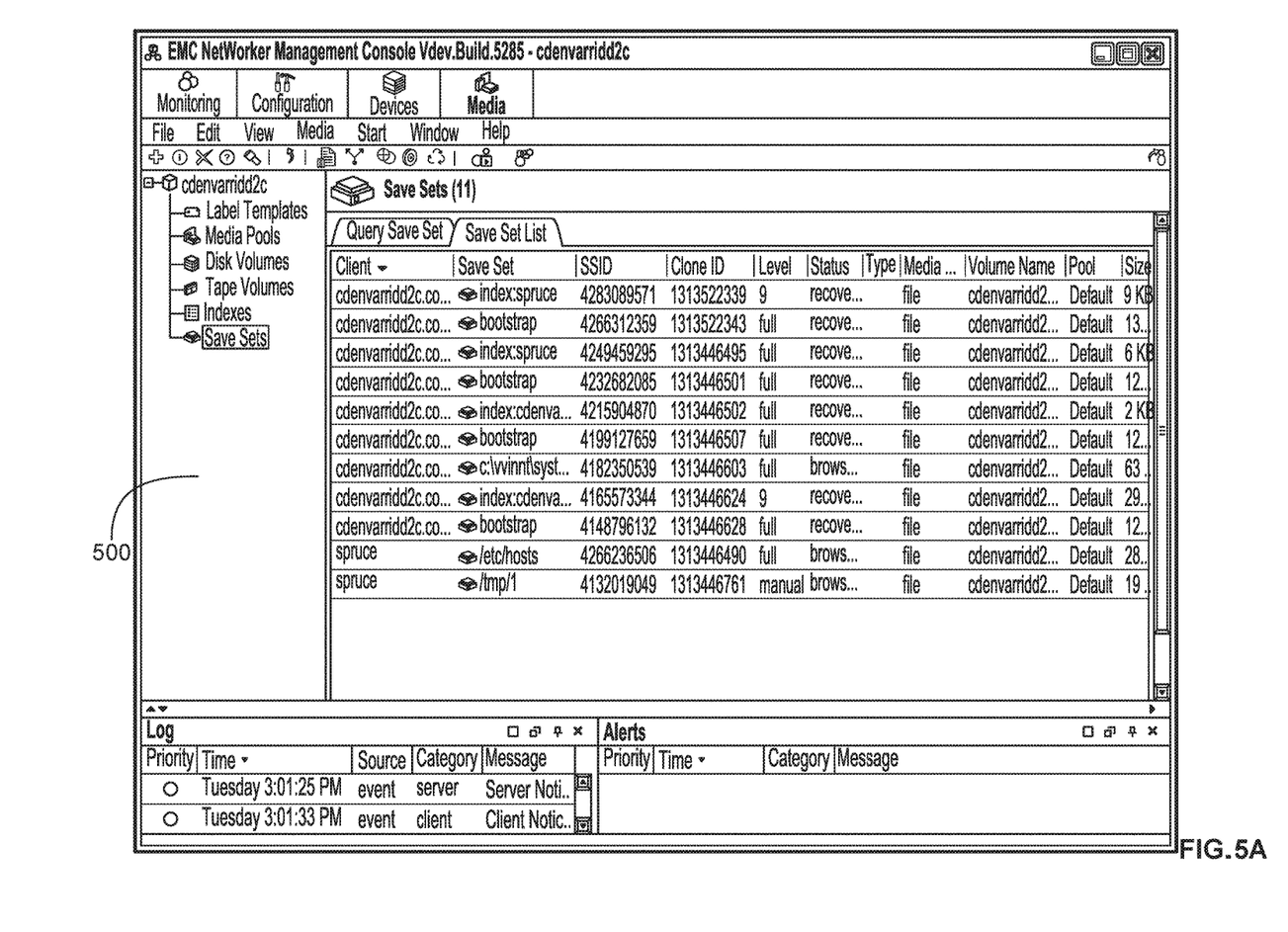
FIG. 5A is a diagram illustrating an embodiment of a GUI window 500 for a top-level IT administrator to view the save sets.
Figure 5B:
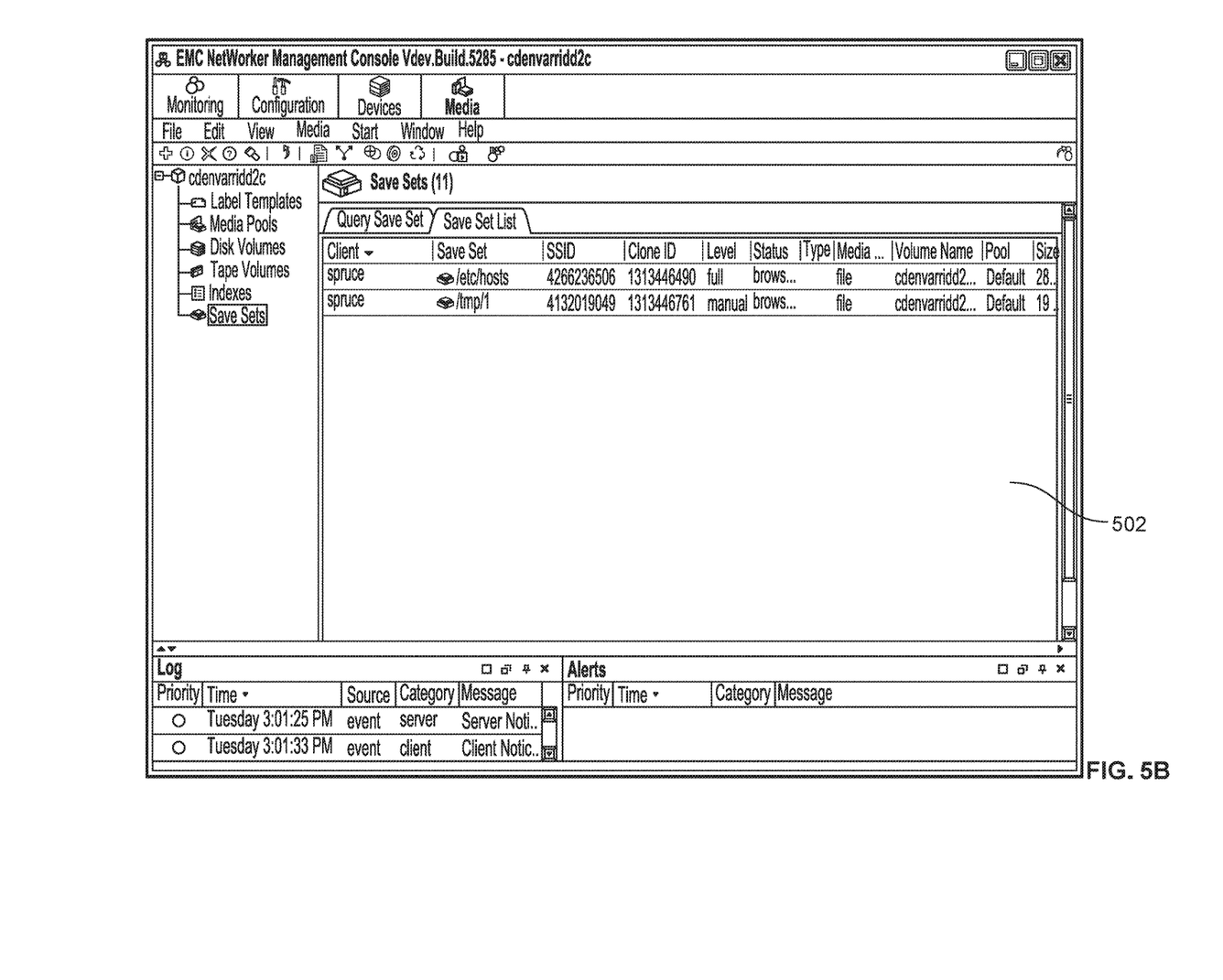
FIG. 5B is a diagram illustrating an embodiment of a GUI window 502 for the lower-level IT administrator to view the save sets.

FIG. 5A is a diagram illustrating an embodiment of a GUI window 500 for a top-level IT administrator to view the save sets. FIG. 5B is a diagram illustrating an embodiment of a GUI window 502 for the lower-level IT administrator to view the save sets. As shown in FIG. 5A, the top-level IT administrator is shown a total of eleven save sets. In contrast, as shown in FIG. 5B, the lower-level IT administrator is shown only two of the eleven save sets that are visible to the top-level IT administrator. Fewer save sets are visible to the lower-level IT administrator because save sets that are not within the restricted data zone managed by the lower-level IT administrator are filtered out. As a result, save sets corresponding to different restricted data zones are segregated.

Figure 6:
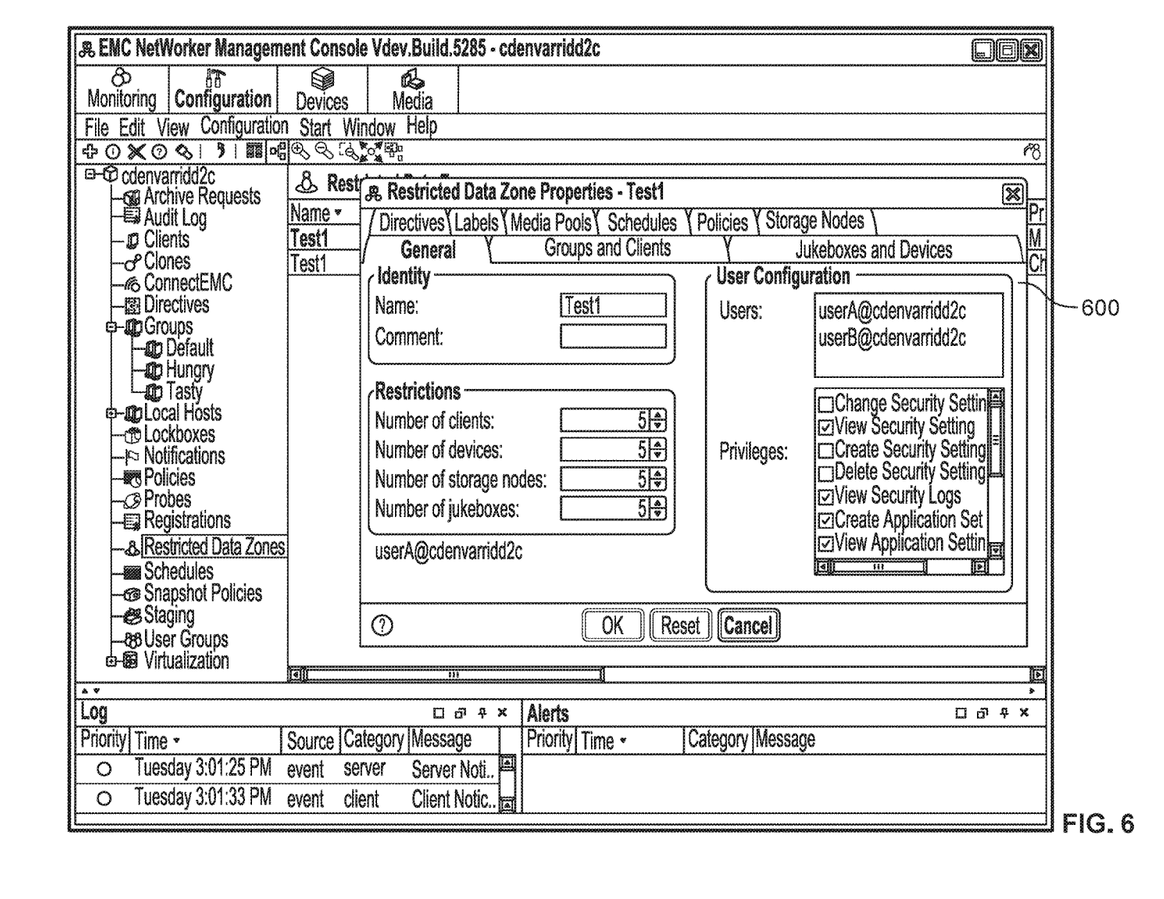
FIG. 6 is a diagram illustrating an embodiment of a GUI pop-pop window 600 for a top-level IT administrator to configure a second instance of "Test1" for a group of regular users associated with the restricted data zone "Test1."

In some embodiments, multiple instances of a single restricted data zone may be created in order to differentiate the privileges enjoyed by different groups of users within a particular restricted data zone. For example, a first group of users may include a lower-level IT administrator who is responsible for managing the restricted data zone and a second group of users may include regular users who have no administrative power over the restricted data zone but have privileges to schedule basic backup and recovery procedures for their individual workstations. Referring back to FIG. 3A, a top-level IT administrator configures a first instance of a restricted data zone named "Test1." In this first instance of "Test1," user "varrid" is a lower-level IT administrator with many administrative privileges, including privileges to change, create, or delete security settings. FIG. 6 is a diagram illustrating an embodiment of a GUI pop-pop window 600 for a top-level IT administrator to configure a second instance of "Test1" for a group of regular users associated with the restricted data zone "Test1." As shown in FIG. 6, the second instance of "Test1" includes two regular users: userA and userB. The regular users have only basic privileges, including viewing the security settings or the security logs, creating application settings, and the like.

In some embodiments, a restricted data zone may have many backup resources 114, but each resource can only be associated with a single restricted data zone. In some embodiments, a resource can be manually associated with a restricted data zone. In some embodiments, a resource can be automatically associated with a restricted data zone if the resource is created by a user associated with the restricted data zone. In some embodiments, resources are organized in a hierarchical structure and when a parent resource is associated with a restricted data zone, the child resource is automatically associated with the restricted data zone as well. In some embodiments, backup and recovery system 200 includes global resources that are not associated with any restricted data zone.

Figure 7:
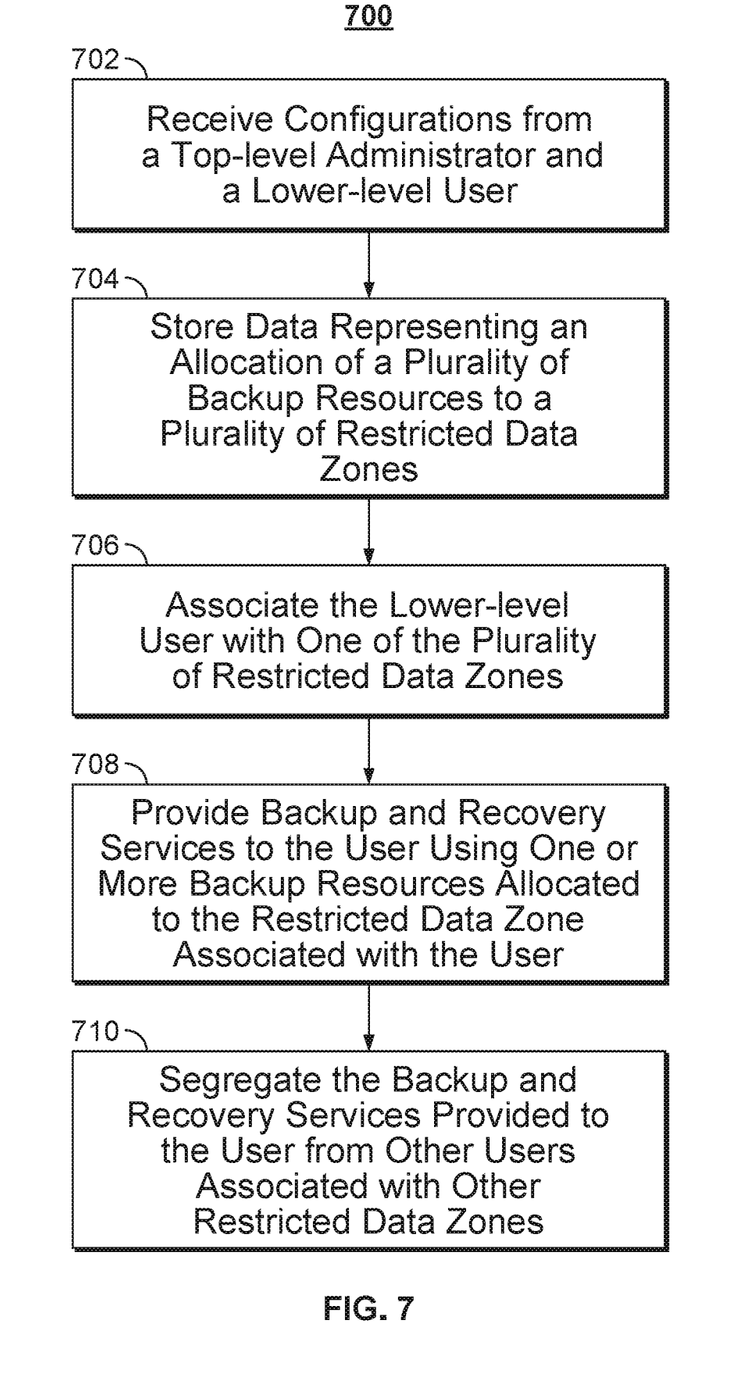
FIG. 7 is a diagram illustrating an exemplary process 700 for backup and recovery server 110.

FIG. 7 is a diagram illustrating an exemplary process 700 for backup and recovery server 110. At 702, configurations are received from a top-level IT administrator and a lower-level user associated with a restricted data zone. The top-level IT administrator may create a restricted data zone, set up a number of restrictions for the restricted data zone, specify the lower-level user as a user associated with the restricted data zone, and grant one or more privileges to the lower-level user.

Figure 8:
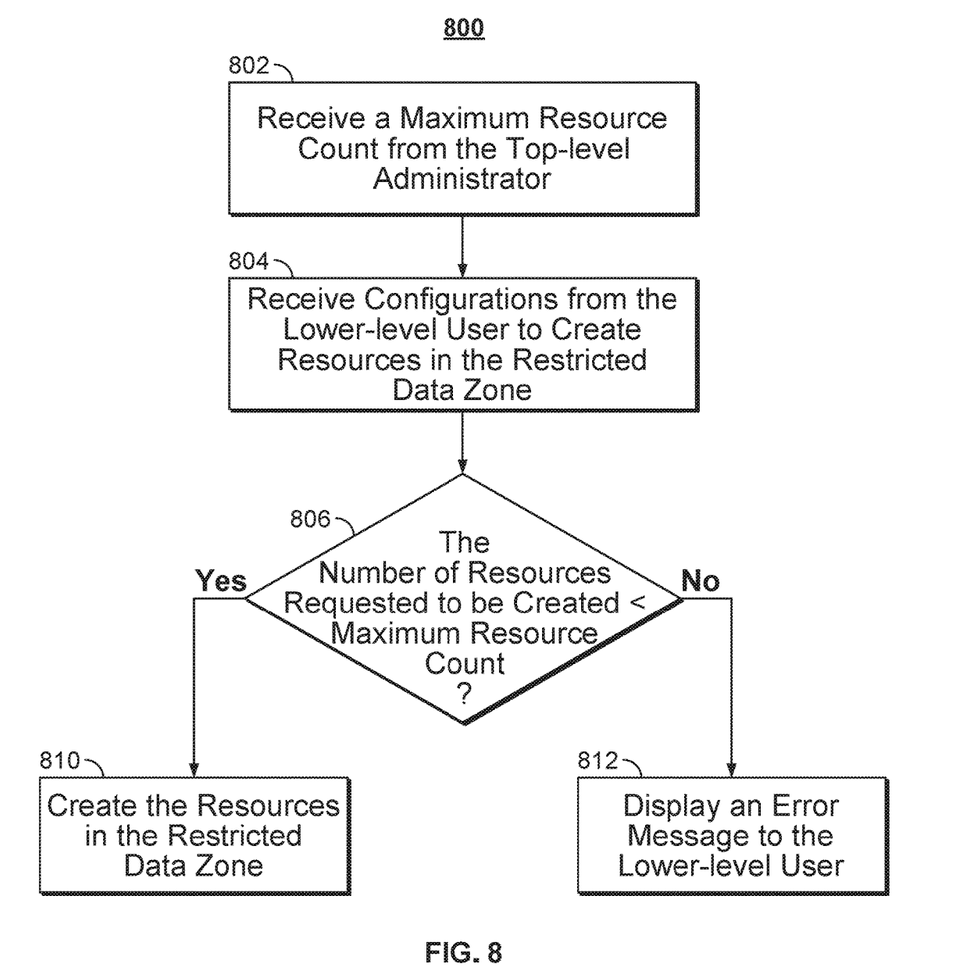
FIG. 8 is a diagram illustrating an exemplary process 800, which can be used to implement step 702 of process 700 in FIG. 7.

In some embodiments, the top-level IT administrator may configure backup and recovery server 110 to limit the maximum number of clients, devices, storage nodes, and jukeboxes that can be created in the restricted data zone. FIG. 8 is a diagram illustrating an exemplary process 800 for creating resources in a restricted data zone. Process 800 can be used to implement a portion of step 702 of process 700 in FIG. 7. At 802, backup and recovery server 110 may receive a maximum resource count from the top-level administrator. For example, the maximum resource count may be a maximum client count, a maximum storage node count, a maximum device count, and the like. At 804, backup and recovery server 110 may receive configurations from the lower-level user to create a number of resources in the restricted data zone. For example, the lower-level user may attempt to create a number of devices in the restricted data zone. At 810, if the number of resources requested to be created in the restricted data zone is fewer than or equal to the corresponding maximum resource count, then the requested resources are created in the restricted data zone. Otherwise, an error message is displayed to the lower-level user and the requested resources are not created.

With continued reference to FIG. 7, data representing an allocation of a plurality of backup resources to a plurality of restricted data zones is stored at 704. Note that any of the plurality of backup resources allocated to one restricted data zone is not allocated to another restricted data zone. At 706, the lower-level user is associated with one of the plurality of restricted data zones. At 708, backup and recovery server 110 provides backup and recovery services to the lower-level user by using one or more backup resources allocated to the restricted data zone associated with the user. At 710, backup and recovery server 110 segregates the backup and recovery services provided to the user from other users associated with restricted data zones that are different from the restricted data zone associated with the user.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A backup and recovery server, comprising:
a storage device providing backup resources;
a first communication interface for displaying information to and receiving configuration from a top-level administrator of the backup and recovery server;
a second communication interface for displaying information to and receiving configuration from a tenant administrator associated with a tenant of the backup and recovery server, wherein the tenant comprises a company or organization that is under a different administrative control from that of other tenants; and
a processor coupled to the storage device and configured to:
cause the first communication interface to display to the top-level administrator available backup resources of the storage device, wherein the available backup resources are portions of the backup resources that are available to be allocated to one or more restricted data zones;

receive from the first communication interface configurations from the top-level administrator, wherein the configurations from the top-level administrator comprise external configurations of a restricted data zone associated with the tenant, wherein the external configurations specify portions of the backup resources to be allocated to the restricted data zone associated with the tenant;

store in the storage device data representing the external configurations of the restricted data zone associated with the tenant, such that the backup resources allocated to the restricted data zone associated with the tenant can no longer be allocated to another restricted data zone;

cause the second communication interface to display to the tenant administrator only the backup resources allocated to the restricted data zone associated with the tenant, and hide available backup resources and backup resources allocated to other restricted data zones such that the tenant administrator is unaware of the available backup resources and the backup resources allocated to other restricted data zones and is unaware of other tenants sharing the storage device;

receive from the second communication interface configurations from the tenant administrator, wherein the configurations from the tenant administrator comprise internal configurations of the restricted data zone associated with the tenant, wherein the internal configurations of the restricted data zone do not include adding backup resources to the restricted data zone associated with the tenant, and wherein the internal configurations comprise configurations that specify portions of the backup resources allocated to the restricted data zone associated with the tenant to be allocated to users associated with the tenant;

provide backup and recovery services to the users associated with the tenant using the backup resources allocated to the restricted data zone associated with the tenant based on the configurations from the tenant administrator;

segregate the backup and recovery services provided to the users associated with the tenant from backup and recovery services provided to other tenants associated with restricted data zones that are different from the restricted data zone associated with the tenant; and after receiving the external configurations of the restricted data zone associated with the tenant, permit the top-level administrator to modify via the first communication interface the external configurations of the restricted data zone associated with the tenant, but restrict the top-level administrator from internal operations of the restricted data zone associated with the tenant, including restricting the top-level administrator from viewing and modifying the internal configurations of the restricted data zone and restricting the top-level administrator from viewing and modifying backup data backed up by the backup and recovery services provided to the users associated with the tenant, wherein the top-level administrator was previously allowed full access to the backup resources allocated to the restricted data zone prior to their allocation.

2. The system of claim 1, wherein the backup resources include one or more of the following: clients, groups, devices, directives, jukeboxes, labels, media pools, schedules, policies, storage nodes, and operation status.

3. The system of claim 1, wherein segregating the backup and recovery services provided to the users associated with the tenant from the backup and recovery services provided to other tenants associated with restricted data zones that are different from the restricted data zone associated with the tenant comprises:
restricting the other tenants from viewing information corresponding to the backup and recovery services provided to the users associated with the tenant.

4. The system of claim 3, wherein the information comprises backup data corresponding to the users associated with the tenant.

5. The system of claim 3, wherein the information comprises information related to the backup resources allocated to the restricted data zone associated with the tenant.

6. The system of claim 3, wherein restricting the other tenants from viewing information corresponding to the backup and recovery services provided to the users associated with the tenant further comprises:
filtering the information based on a restricted data zone attribute, wherein the restricted data zone attribute identifies a restricted data zone associated with the information.

7. The system of claim 1, wherein segregating the backup and recovery services provided to the users associated with the tenant from the backup and recovery services provided to other tenants associated with restricted data zones that are different from the restricted data zone associated with the tenant comprises:
restricting the other tenants from affecting the backup and recovery services provided to the users associated with the tenant.

8. The system of claim 1, further comprising:
a third communication interface for displaying information to and receiving configuration from a second tenant administrator associated with the tenant of the backup and recovery server, wherein the tenant administrator and the second tenant administrator each belongs to a different department of the tenant, wherein the departments are under different administrative control;
wherein the processor is further configured to:
receive from the first communication interface a second set of configurations from the top-level administrator, wherein the second set of configurations from the top-level administrator comprises external configurations of a second restricted data zone associated with the tenant, wherein the external configurations of the second restricted data zone specify portions of the backup resources to be allocated to the second restricted data zone associated with the tenant;
receive from the third communication interface configurations from the second tenant administrator associated with the tenant, wherein the configurations from the second tenant administrator specify internal configurations of the second restricted data zone;
provide backup and recovery services to users associated with the second restricted data zone associated with the tenant using the backup resources allocated to the second restricted data zone associated with the tenant based on the configurations from the second tenant administrator;

segregate the backup and recovery services provided to the users associated with the second restricted data zone associated with the tenant from backup and recovery services provided to other tenants or other users of the tenant associated with restricted data zones that are different from the second restricted data zone associated with the tenant.

9. The system of claim 1, wherein each tenant is charged a fee based at least in part on an amount of usage of the backup resources allocated to the corresponding restricted data zone.

10. The system of claim 1, wherein the configurations from the top-level administrator include a maximum resource count, wherein the maximum resource count limits a number of the backup resources allocated to the restricted data zone, and wherein the configurations from the tenant administrator associated with the tenant include using backup resources based at least in part on the maximum resource count.

11. The system of claim 10, wherein the configurations from the top-level administrator include a plurality of privileges granted to the tenant, wherein the privileges comprise privileges related to the backup and recovery services provided to the tenant.

12. A method for backing up and recovering data by a backup and recovery server, comprising:
   causing a first communication interface to display to a top-level administrator available backup resources of a storage device, wherein the available backup resources are portions of backup resources of the storage device that are available to be allocated to one or more restricted data zones, wherein the first communication interface displays information to and receives configuration from the top-level administrator of the backup and recovery server;
   receiving from the first communication interface configurations from the top-level administrator, wherein the configurations from the top-level administrator comprise external configurations of a restriction data zone associated with a tenant of the backup and recovery server, wherein the external configurations specify portions of the backup resources to be allocated to the restricted data zone associated with the tenant;
   storing in the storage device data representing the external configurations of the restricted data zone associated with the tenant, such that the backup resources allocated to the restricted data zone associated with the tenant can no longer be allocated to another restricted data zone;
   causing a second communication interface to display to the tenant administrator only the backup resources allocated to the restricted data zone associated with the tenant, and hiding available backup resources and backup resources allocated to other restricted data zones such that the tenant administrator associated with the tenant is unaware of the available backup resources and the backup resources allocated to other restricted data zones and is unaware of other tenants sharing the storage device, wherein the second communication interface displays information to and receives configuration from the tenant administrator associated with the tenant of the backup and recovery server, wherein the tenant comprises a company or organization that is under a different administrative control from that of other tenants;
   receiving from the second communication interface configurations from the tenant administrator associated with the tenant, wherein the configurations from the tenant administrator comprise internal configurations of the restricted data zone associated with the tenant, wherein the internal configurations of the restricted data zone do not include adding backup resources to the restricted data zone associated with the tenant, and wherein the internal configurations comprise configurations that specify portions of the backup resources allocated to the restricted data zone associated with the tenant to be allocated to users associated with the tenant;
   providing backup and recovery services to the users associated with the tenant using the backup resources allocated to the restricted data zone associated with the tenant based on the configurations from the tenant administrator;
   segregating the backup and recovery services provided to the users associated with the tenant from backup and recovery services provided to other tenants associated with restricted data zones that are different from the restricted data zone associated with the tenant;
   after receiving the external configurations of the restricted data zone associated with the tenant, permitting the top-level administrator to modify via the first communication interface the external configurations of the restricted data zone associated with the tenant, but restricting the top-level administrator from internal operations of the restricted data zone associated with the tenant, including restricting the top-level administrator from viewing and modifying the internal configurations of the restricted data zone and restricting the top-level administrator from viewing and modifying backup data backed up by the backup and recovery services provided to the users associated with the tenant, wherein the top-level administrator was previously allowed full access to the backup resources allocated to the restricted data zone prior to their allocation.

13. The method of claim 12, wherein segregating the backup and recovery services provided to the users associated with the tenant from the backup and recovery services provided to other tenants associated with restricted data zones that are different from the restricted data zone associated with the tenant comprises:
   restricting the other tenants from viewing information corresponding to the backup and recovery services provided to the users associated with the tenant.

14. The method of claim 13, wherein the information comprises backup data corresponding to the users associated with the tenant.

15. The method of claim 13, wherein the information comprises information related to the backup resources allocated to the restricted data zone associated with the tenant.

16. The method of claim 13, wherein restricting the other tenants from viewing information corresponding to the backup and recovery services provided to the users associated with the tenant further comprises:
   filtering the information based on a restricted data zone attribute, wherein the restricted data zone attribute identifies a restricted data zone associated with the information.

17. The method of claim 12, wherein segregating the backup and recovery services provided to the users associated with the tenant from the backup and recovery services provided to other tenants associated with restricted data zones that are different from the restricted data zone associated with the tenant comprises:

restricting the other tenants from affecting the backup and recovery services provided to the users associated with the tenant.

18. The method of claim 12, wherein the configurations from the top-level administrator include a maximum resource count, wherein the maximum resource count limits a number of the backup resources allocated to the restricted data zone, and wherein the configurations from the tenant administrator associated with the tenant include using backup resources based at least in part on the maximum resource count.

19. The method of claim 18, wherein the configurations from the top-level administrator include a plurality of privileges granted to the tenant, wherein the privileges comprise privileges related to the backup and recovery services provided to the tenant.

20. A computer program product for backing up and recovering data by a backup and recovery server, the computer program product being embodied in a tangible non-transitory computer readable storage medium and comprising computer instructions for:

causing a first communication interface to display to a top-level administrator available backup resources of a storage device, wherein the available backup resources are portions of the backup resources that are available to be allocated to one or more restricted data zones, wherein the first communication interface displays information to and receives configuration from the top-level administrator of the backup and recovery server;

receiving from the first communication interface configurations from the top-level administrator, wherein the configurations from the top-level administrator comprise external configurations of a restricted data zone associated with the tenant, wherein the external configuration specify portions of the backup resources to be allocated to the restricted data zone associated with the tenant;

storing in the storage device data representing the external configurations of the restricted data zone associated with the tenant, such that the backup resources allocated to the restricted data zone associated with the tenant can no longer be allocated to another restricted data zone;

causing a second communication interface to display to the tenant administrator only the backup resources allocated to the restricted data zone associated with the tenant, and hiding available backup resources and backup resources allocated to other restricted data zones such that the tenant administrator is unaware of the available backup resources and the backup resources allocated to other restricted data zones and is unaware of other tenants sharing the storage device, wherein the second communication interface displays information to and receives configuration from the tenant administrator associated with the tenant of the backup and recovery server, wherein the tenant comprises a company or organization that is under a different administrative control from that of other tenants;

receiving from the second communication interface configurations from the tenant administrator, wherein the configurations from the tenant administrator comprises internal configurations of the restricted data zone associated with the tenant, wherein the internal configurations of the restricted data zone do not include adding backup resources to the restricted data zone associated with the tenant, and wherein the internal configurations comprise configurations that specify portions of the backup resources allocated to the restricted data zone associated with the tenant to be allocated to users associated with the tenant;

providing backup and recovery services to the users associated with the tenant using the backup resources allocated to the restricted data zone associated with the users associated with the tenant based on the configurations from the tenant administrator;

segregating the backup and recovery services provided to the users associated with the tenant from backup and recovery services provided to other tenants associated with restricted data zones that are different from the restricted data zone associated with the tenant;

after receiving the external configurations of the restricted data zone associated with the tenant, permitting the top-level administrator to modify via the first communication interface the external configurations of the restricted data zone associated with the tenant, but restricting the top-level administrator from internal operations of the restricted data zone associated with the tenant, including restricting the top-level administrator from viewing and modifying the internal configurations of the restricted data zone and restricting the top-level administrator from viewing and modifying backup data backed up by the backup and recovery services provided to the users associated with the tenant, wherein the top-level administrator was previously allowed full access to the backup resources allocated to the restricted data zone prior to their allocation.

* * * * *

UNITED STATES PATENT AND TRADEMARK OFFICE
CERTIFICATE OF CORRECTION

PATENT NO.         : 10,095,587 B1
APPLICATION NO.    : 13/336898
DATED              : October 9, 2018
INVENTOR(S)        : Varrin et al.

It is certified that error appears in the above-identified patent and that said Letters Patent is hereby corrected as shown below:

On the Title Page

Item (75), Inventors, delete "Michael Jacek Drozd" and insert --Michal Jacek Drozd--, therefor.

Item (75), Inventors, "Michal Jacek Drozd", City Name, delete "Cracow" and insert --Krakow--, therefor.

Signed and Sealed this
Ninth Day of April, 2019

Andrei Iancu
*Director of the United States Patent and Trademark Office*